United States Patent
Levin et al.

(10) Patent No.: US 10,796,023 B2
(45) Date of Patent: Oct. 6, 2020

(54) TECHNIQUES FOR MAINTAINING IMAGE INTEGRITY IN CONTAINERIZED APPLICATIONS

(71) Applicant: Twistlock, Ltd., Herzliya (IL)

(72) Inventors: Liron Levin, Herzliya (IL); John Morello, Baton Rouge, LA (US); Dima Stopel, Herzliya (IL)

(73) Assignee: Twistlock, Ltd, Herzliya (IL)

( * ) Notice: Subject to any disclaimer, the term of this patent is extended or adjusted under 35 U.S.C. 154(b) by 184 days.

(21) Appl. No.: 16/026,557

(22) Filed: Jul. 3, 2018

(65) Prior Publication Data

US 2020/0012818 A1    Jan. 9, 2020

(51) Int. Cl.
| | | |
|---|---|---|
| G06F 21/64 | (2013.01) | |
| G06T 7/00 | (2017.01) | |
| G06T 11/60 | (2006.01) | |
| G06F 16/51 | (2019.01) | |

(52) U.S. Cl.
CPC .............. *G06F 21/64* (2013.01); *G06F 16/51* (2019.01); *G06T 7/0002* (2013.01); *G06T 11/60* (2013.01); *G06T 2207/20081* (2013.01)

(58) Field of Classification Search
None
See application file for complete search history.

(56) References Cited

U.S. PATENT DOCUMENTS

| | | | | |
|---|---|---|---|---|
| 10,104,185 | B1* | 10/2018 | Sharifi Mehr | H04L 67/16 |
| 2017/0187540 | A1* | 6/2017 | Stopel | H04L 9/3268 |
| 2018/0218149 | A1* | 8/2018 | Jacobs | G06F 21/54 |
| 2018/0349150 | A1* | 12/2018 | Wong | G06F 9/4492 |
| 2018/0349610 | A1* | 12/2018 | Gupta | G06F 21/51 |

* cited by examiner

*Primary Examiner* — Fayyaz Alam
(74) *Attorney, Agent, or Firm* — M&B IP Analysts, LLC

(57) ABSTRACT

A system and method for maintaining image integrity in a containerized environment. Image layers of a software container are scanned for metadata. The metadata is indexed and contextual metadata is added. Execution of the containerized environment is monitored to detect new image layers being executed. Integrity of images in the environment is maintained based on integrity rules and the metadata of each image layer. The integrity rules ensure image integrity by ensuring that pulled images are composed from trusted images, image layers are pushed by trusted users, image layers do not include potential vulnerabilities, and image layers do not override specific file paths. Trusted image layers may be automatically detected using a machine learning model trained based on historical image layer metadata.

15 Claims, 4 Drawing Sheets

TECHNIQUES FOR MAINTAINING IMAGE INTEGRITY IN CONTAINERIZED APPLICATIONS

TECHNICAL FIELD

The present disclosure relates generally to containerized applications, and more particularly to security of containerized applications.

BACKGROUND

A software container is an instance of a user-space running an application within the operating system (OS) of a host device (e.g., a server). Software containers enable operating-system-level virtualization in which the OS kernel allows the existence of multiple isolated software containers.

A software container (also known as a container) provides an executable environment with a complete filesystem. The filesystem may contain code, runtime, system tools, system libraries, and so on. That is, execution of a software container can be the same regardless of the underlying infrastructure. Docker is one of the popular existing platforms for creating, migrating, managing, and deploying software containers.

A software container, unlike a virtual machine, does not require or include a separate operating system. Rather, the container relies on the kernel's functionality and uses hardware resources (CPU, memory, I/O, network, etc.) and separate namespaces to isolate the application's view of the operating system. A software container can access the OS kernel's virtualization features either directly or indirectly. For example, Linux kernel can be accessed directly using the libcontainer library or indirectly using the libvirt service.

As demonstrated in FIG. 1, a number of software containers (i.e., the app containers 110-1 through 110-$n$, hereinafter referred to individually as a container 110, merely for simplicity purposes) can access and share the same OS kernel 120. However, each container 110 can be constrained to only use a defined amount of hardware resources (e.g., CPU, memory, etc.) in the underlying hardware layer 130. Thus, using software containers, hardware resources can be isolated, services can be restricted, and processes can be provisioned to have an almost completely private view of the operating system with their own process ID space, file system structure, and network interfaces.

FIG. 2 illustrates a typical structure of a software container 200. The software container 200 includes a base image 210 and a container layer 220. The base image 210 includes one or more image layers 215-1 through 215-$q$ (hereinafter referred to individually as a layer 215 and collectively as layers 215, merely for simplicity purposes). The layers 215 are read-only layers that represent filesystem differences. That is, the layers 215 are stacked on top of each other to form a base for the container's 200 root filesystem. The layers 215 are read only, and each layer 215 is identified by a randomly generated identifier number of a checksum computed using a hash function.

The base image 210 (and its layers 215) can be shared across different software containers. Thus, only the container layer 220 differentiates between one software container and another. The container layer 220 is a readable and writable layer where all data written to the software container 200 are saved in the container layer 220. When the software container 200 is deleted, the writable container layer 220 is also deleted, and the base image 210 remains unchanged. As such, the multiple software containers 200 can share access to the same base image 210, each of which has its own data state. In the example illustrated in FIG. 2, the software container 200 is a Docker container (e.g., compliant with the Docker platform).

The popularity of software containers has been increased due to the easy integration with cloud-computing platforms (e.g., Amazon® Web Services, Google® Cloud Platform, Microsoft® Azure, etc.). On such platforms, service providers can offer operating systems to run services and applications. With that said, the increasing reliance on software containers increases the need for secured execution.

Because images can be shared among containers, the same image may have access to files of different systems. Thus, it is important to ensure integrity of images, for example, by ensuring that any images to be run are trusted, untampered, and up-to-date. Images provided by entities that are not trusted, that have been tampered with, or that have not been updated to the newest version may introduce security flaws during execution.

Existing solutions for maintaining image integrity include verifying the publisher of an image by, for example, signing the image with a private key of the publisher. Accordingly, a public key of the publisher may be used to verify the image, thereby ensuring its integrity. Although the existing solutions allow for confirming integrity of images, there are drawbacks, particularly with respect to the flexibility of verification. Specifically, because images of each publisher are verified based on a single unique key of the publisher, partial constraints on publishing are not enabled (i.e., images are only verified or unverified with respect to the keys). Additionally, historical data is not supported and, as such, older identifiers are not considered trusted even when the image is otherwise safe for execution.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for maintaining image integrity in a containerized environment, the containerized environment including a software container composed from a plurality of image layers. The method comprises: indexing metadata of the software container, wherein the indexed metadata includes a unique signature of each image layer, wherein the signature of each image layer is based on contents of the image layer and of each previous image layer of the plurality of image layers; determining whether each image layer is trusted based on the indexed metadata and a plurality of integrity rules, wherein determining whether each image layer is trusted further comprises: determining whether the image layer is composed from a trusted image, and determining whether the image layer meets the plurality of integrity rules when the image layer is above a known trusted image layer of the plurality of image layers; and pulling each image layer that is not determined as trusted.

Certain embodiments disclosed herein also include a non-transitory computer readable medium having stored thereon causing a processing circuitry to execute a process for maintaining image integrity in a containerized environment, the containerized environment including a software container composed from a plurality of image layers, the process comprising: indexing metadata of the software container, wherein the indexed metadata includes a unique signature of each image layer, wherein the signature of each image layer is based on contents of the image layer and of each previous image layer of the plurality of image layers; determining whether each image layer is trusted based on the indexed metadata and a plurality of integrity rules, wherein determining whether each image layer is trusted further comprises: determining whether the image layer is composed from a trusted image, and determining whether the image layer meets the plurality of integrity rules when the image layer is above a known trusted image layer of the plurality of image layers; and pulling each image layer that is not determined as trusted.

Certain embodiments disclosed herein also include a system for maintaining image integrity in a containerized environment, the containerized environment including a software container composed from a plurality of image layers. The system comprises: a processing circuitry; and a memory, the memory containing instructions that, when executed by the processing circuitry, configure the system to: index metadata of the software container, wherein the indexed metadata includes a unique signature of each image layer, wherein the signature of each image layer is based on contents of the image layer and of each previous image layer of the plurality of image layers; determine whether each image layer is trusted based on the indexed metadata and a plurality of integrity rules, wherein the system is further configured to: determine whether the image layer is composed from a trusted image, and determine whether the image layer meets the plurality of integrity rules when the image layer is above a known trusted image layer of the plurality of image layers; and pull each image layer that is not determined as trusted.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
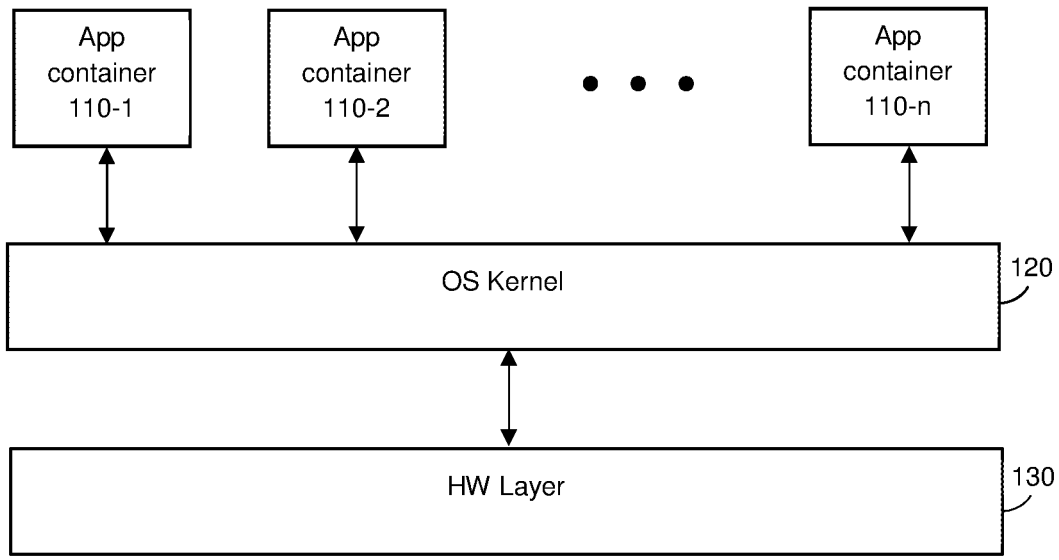
FIG. 1 is a diagram illustrating execution of a plurality of software containers.
Figure 2:
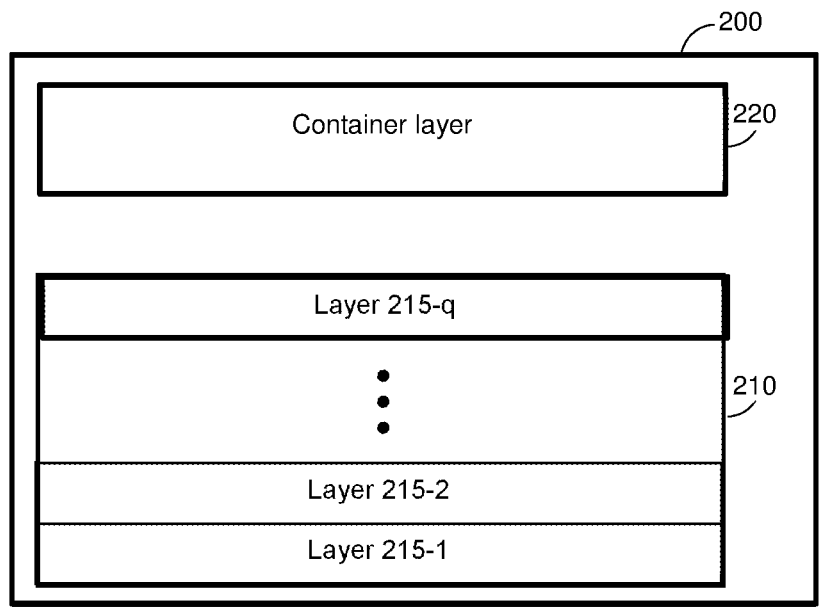
FIG. 2 is a diagram illustrating a structure of a software container.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for maintaining image integrity in containerized environments. In the various disclosed embodiments, each software container executed in a containerized environment includes multiple image layers, and each image layer is assigned a unique cryptographic signature identifying the content of the image layer, of all previous image layers, and the metadata of a specification of the image (e.g., environmental variables, entrypoints, and the like). During an intake process, existing metadata of each image layer is indexed and new metadata is added. The indexed metadata for an image layer includes at least the unique cryptographic signature, tags, and timestamps of the image layer. The indexed metadata may be stored in a database acting as a central repository. The new metadata indicates contextual information related to the addition or use of the image layer such as, but not limited to, the user that pushed an image of the image layer (e.g., a user name of the user), job name, environment, and the like.

During execution of the containerized environment, integrity of the environment is enforced based on the metadata of image layers running in the environment. The enforcement includes determining whether image layers are trusted based on integrity rules. Image layers that are not trusted may be removed such that they are not executed. An image layer is not trusted when the image layer does not meet one or more of the integrity rules. The integrity rules ensure the following. First, only images composed from trusted images are allowed to be pulled. Second, all image layers above a trusted layer of each pulled image must be published by one or more trusted users. Third, each image layer above a trusted layer of each pulled image must not include a software package having one or more vulnerabilities, custom scripts, or out-of-date code. Fourth, each image layer above a trusted layer of each pulled image cannot override a specific file path.

Some embodiments further allow for detecting trusted image layers using a machine learning model trained based on common identifiers of images (such as base layer, publisher, etc.). To this end, the machine learning may include training a machine learning model using a training set including metadata of image layers. The training set metadata includes metadata that is indexed and added as described herein. Policies for protecting against malicious image layers may be automatically built and enforced based on image layers that are not detected as trusted image layers. As a non-limiting example, for a cluster of software containers in an environment, only images originating from a a specific set of repositories may be run. As another example, for the cluster, images should only be pulled by kubernetes agent using particular authorization keys. As yet another example, a time from publication of the image to running the image in an environment should be capped.

In an embodiment, the machine learning model may be trained to learn zones or namespaces requiring highly trusted images. To this end, the training set may include a zone or namespace of the environment in which images are run and images allowed to run in each zone or namespace. For example, if a namespace contains highly sensitive data (e.g., sensitive user data), only highly trusted images may be run in the environment and other images may be blocked or an alert may be generated when images other than the trusted images are run in the environment.

Figure 3:
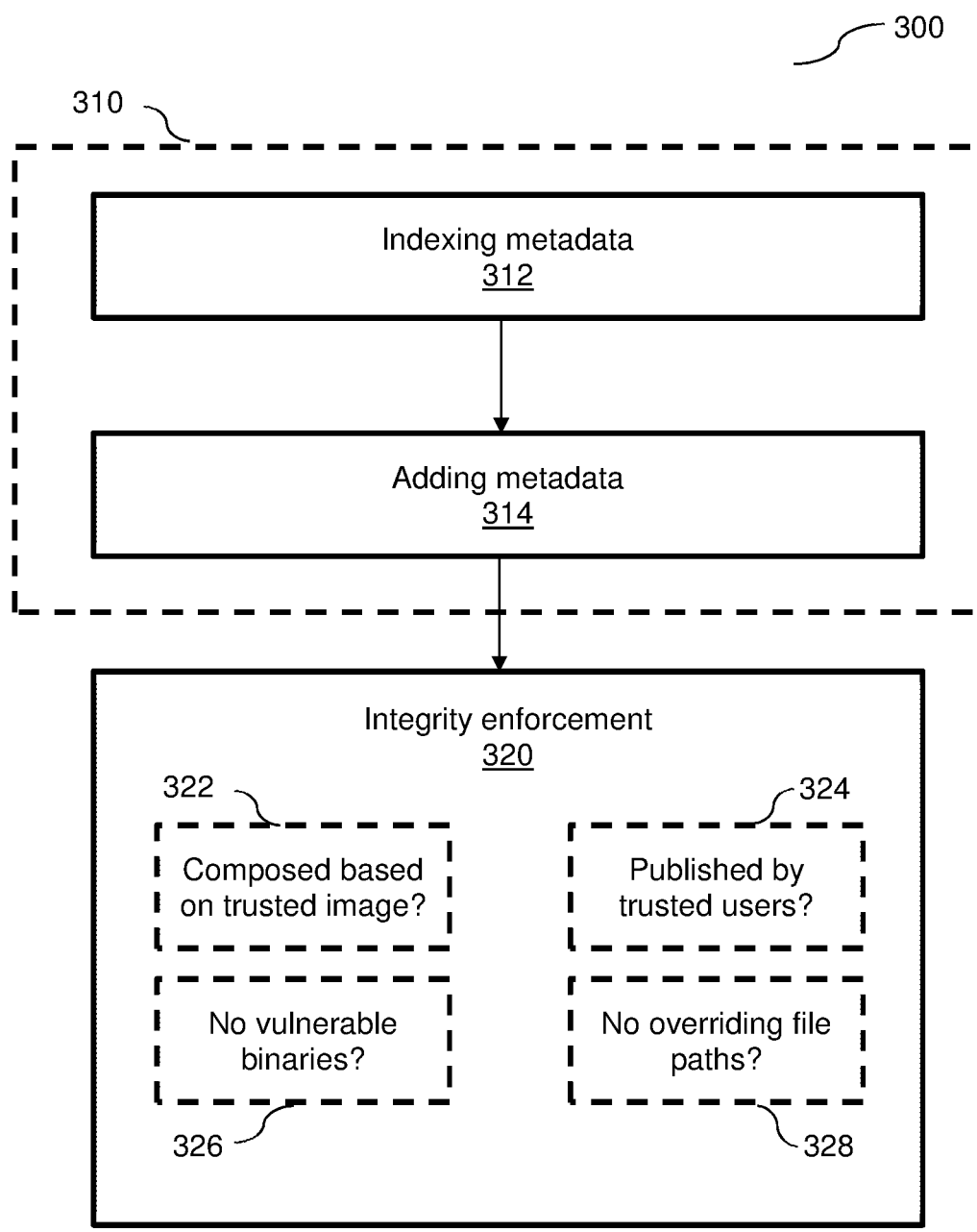
FIG. 3 is a flow diagram illustrating maintaining image integrity of a software container according to an embodiment.

FIG. 3 shows an example flow diagram 300 illustrating maintaining image integrity in a containerized environment according to an embodiment. The example flow diagram 300 includes intake processing 310 and integrity enforcement 320. The intake processing 310 is a process for scanning and pushing images to prepare for the integrity enforcement 320. The intake processing 310 includes indexing existing metadata 312 and adding new metadata 314. As part of a scanning process, the indexing metadata 312 includes indexing signatures, tags, and timestamps of image layers running in a software container. The indexed metadata may be stored in a central repository database (not shown). The adding metadata 314 includes adding metadata to each image layer of the software container that provides contextual information about the origin or use of the image layer. For example, the added metadata may indicate, but is not limited to, which user pushed the image of the image layer, a job name, an environment in which the image layer is run, and the like. The added metadata may also be stored in the central repository.

After the intake processing 310, the integrity enforcement 320 is performed. In the example implementation shown in FIG. 3, the integrity enforcement 320 includes applying integrity rules 322, 324, 326, and 328 based on the indexed and added metadata for each image layer. If any of the rules 322, 324, 326, and 328 are not met, the image layer is pulled such that it ceases running.

Figure 4:
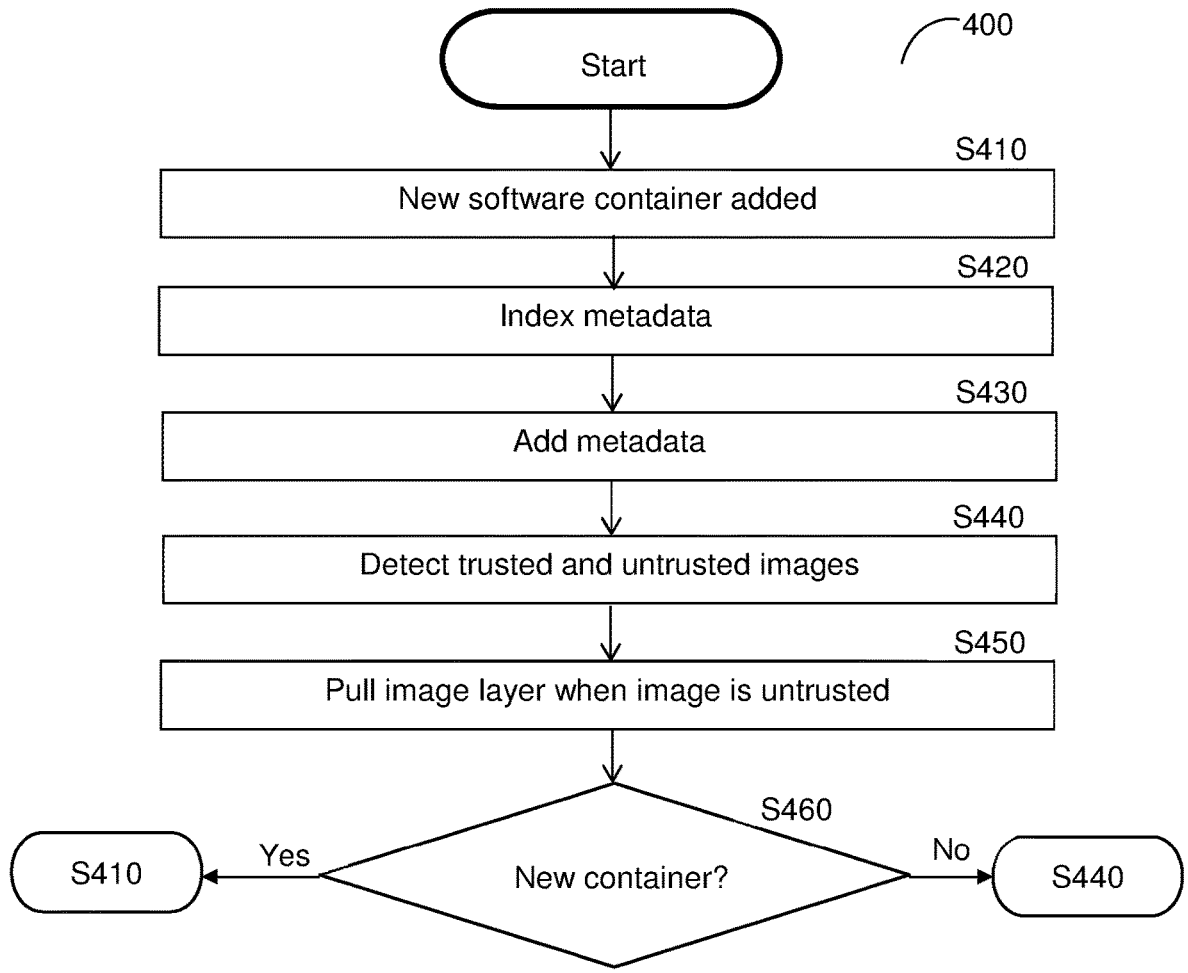
FIG. 4 is a flowchart illustrating a method for maintaining image integrity of a software container according to an embodiment.

FIG. 4 is an example flowchart 400 illustrating a method for maintaining image integrity in a containerized environment according to an embodiment. In an embodiment, the containerized environment is configured to execute software containers. Each software container includes image layers and each image layer is assigned a unique cryptographic signature.

At S410, a new software container is detected in the containerized environment. The new software container may be a software container that was newly added to the containerized environment or an existing software container whose contents were changed.

At S420, metadata of the new software container is indexed and stored in a database. The indexed metadata includes at least a unique signature of each image layer of the software container as well as any tags and timestamps of each image layer. The unique signature of each image layer may be a cryptographic signature that includes a hash of the contents of the image layer as well as of previous image layers.

At S430, contextual metadata indicating circumstances related to pushing of an image of each image layer or running of each image layer is added to the respective image layer. The contextual metadata may indicate, but is not limited to, a user that pushed the image on which the image layer is based (e.g., a base image for the image layer), an environment in which the image layer will run, a name of a job for which the image layer will be used, historical data related to previous versions of the image layer, and the like. The contextual metadata is also indexed and stored in the central repository.

In some implementations, the metadata for each image layer may be utilized to train a machine learning model to detect trusted image layers based on normal image layer behavior. Policies for enforcing image integrity may further include pulling image layers that are not trusted. The machine learning model may be trained to determine common identifiers of images (e.g., base layer, publisher, repository of origin, agent which pulls the image layer, etc.) such that trusted images can be identified. As an example, in a cluster, only images originating from a repository on a list of trusted repositories may be run. As another example, images in a cluster should only be pulled by kubernetes agent (i.e., a user or process other than kubernetes agent should not pull images from the machine in the cluster).

The features used for training the machine learning model may include, but are not limited to, contents of an image layer, name of the image layer, repository from which an image of the image layer was pulled, a set of repositories from which the image was pulled, geographic location of the source of the image, an entity that pulled the image (i.e., manually versus automatic loading)

At S440, based on the metadata of the image layers, trusted and untrusted image layers in the software containers are detected. The image layers may be detected as trusted or untrusted based on integrity rules. As defined in the integrity rules, an image layer may not be trusted unless it is based on an image composed from a specific image (e.g., ubuntu: 14.04). Additionally, image layers above a trusted layer may be checked for, a user who pushed the image layer, potential vulnerabilities in binaries, overriding file paths, and the like. Any trusted layers may not be checked in order to reduce redundant processing.

In an embodiment, an identity of the image layer may be determined using the machine learning model trained using historical image metadata, thereby allowing for identification of images even when the name or other explicit identifier of the image does not necessarily reflect its contents. As a non-limiting example, for an image named "FU-1," an image named "FU-2" may be an updated image while an image named "BU-2" may be a different image. However, when "FU-1" is modified without changing its name, an image that is effectively a different image may appear to be the same image.

At optional S450, each image layer of an untrusted image is pulled. Pulling the image layer prevents running of the image layer, thereby mitigating any harm from running potentially malicious images.

At S460, it is checked if any new containers have been detected and, if so, execution continues with S410; otherwise, execution continues with S440 for additional enforcement.

It should be noted that FIG. 4 is described with respect to enforcing image integrity for a single software container merely for simplicity purposes, and that integrity enforcement for multiple containers may be performed simultaneously without departing from the scope of the disclosure.

Figure 5:
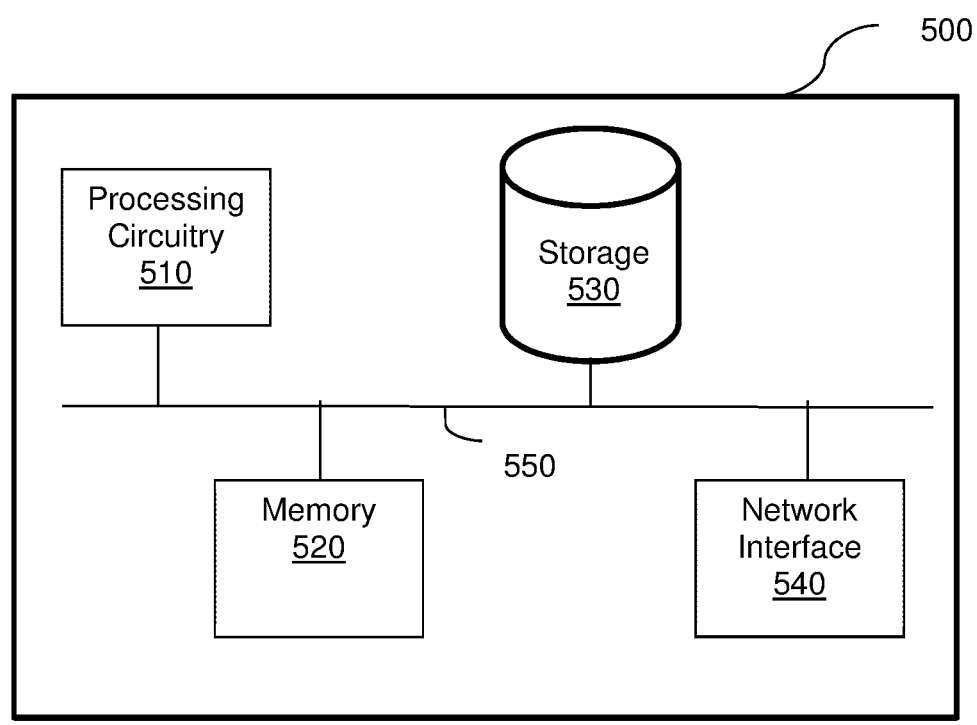
FIG. 5 is a schematic diagram illustrating an image integrity enforcement system according to an embodiment.

FIG. 5 is an example schematic diagram of an image integrity enforcement system 500 according to an embodiment. The image integrity enforcement system 500 includes a processing circuitry 510 coupled to a memory 520, a storage 530, and a network interface 540. The components of the image integrity enforcement system 500 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 520 may be volatile (e.g., RAM, etc.), non-volatile (e.g., ROM, flash memory, etc.), or a combination thereof. In one configuration, computer readable instructions to implement one or more embodiments disclosed herein may be stored in the storage 530.

In another embodiment, the memory 520 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, configure the processing circuitry 510 to perform the various processes described herein.

The storage 530 may be magnetic storage, optical storage, and the like, and may be realized, for example, as flash memory or other memory technology, CD-ROM, Digital Versatile Disks (DVDs), or any other medium which can be used to store the desired information.

The network interface 540 allows the image integrity enforcement system 500 to communicate over a network, for the purpose of, for example, collecting metadata from software containers, storing indexed metadata in a database, and the like.

It should be understood that the embodiments described herein are not limited to the specific architecture illustrated in FIG. 5, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for maintaining image integrity in a containerized environment, the containerized environment including a software container composed from a plurality of image layers, the method comprising:
    indexing metadata of the software container, wherein the indexed metadata includes a unique signature of each image layer, wherein the signature of each image layer is based on contents of the image layer and of each previous image layer of the plurality of image layers;
    determining whether each image layer is trusted based on the indexed metadata and a plurality of integrity rules, wherein determining whether each image layer is trusted further comprises:
        determining whether the image layer is composed from a trusted image, and
        determining whether the image layer meets the plurality of integrity rules when the image layer is above a known trusted image layer of the plurality of image layers; and
    pulling each image layer that is not determined as trusted.

2. The method of claim 1, wherein determining whether each image layer meets the plurality of integrity rules when the image layer is above a known trusted image layer of the plurality of image layers further comprises:
    determining whether the image layer is composed from an image that was pushed by at least one trusted user.

3. The method of claim 1, wherein determining whether each image layer meets the plurality of integrity rules when the image layer is above a known trusted image layer of the plurality of image layers further comprises:
    determining whether the image layer contains at least one potentially vulnerable software package.

4. The method of claim 3, wherein a software package is potentially vulnerable when at least one of: the software package includes at least one known vulnerability, the software package includes a custom script, and the software package is not up-to-date.

5. The method of claim 1, wherein determining whether each image layer meets the plurality of integrity rules when the image layer is above a known trusted image layer of the plurality of image layers further comprises:
    determining whether the image layer overrides at least one file path.

6. The method of claim 1, wherein determining whether the image layer is composed from a trusted image is based on the indexed metadata and a machine learning model trained to detect trusted images using a training set including historical indexed metadata of a plurality of historical image layers.

7. The method of claim 6, wherein the training set metadata includes at least one of: contents of each historical image layer, name of each historical image layer, repository from which an image of each historical image layer was pulled, a set of repositories from which an image of each historical image layer was pulled, geographic location of a source of an image of each historical image layer, and an entity that pulled an image of each historical image layer.

8. A non-transitory computer readable medium having stored thereon instructions for causing a processing circuitry to execute a process for maintaining image integrity in a containerized environment, the containerized environment including a software container having at least one image layer, the process comprising:
　indexing metadata of the software container, wherein the indexed metadata includes a unique signature of each image layer, wherein the signature of each image layer is based on contents of the image layer and of each previous image layer of a plurality of image layers;
　determining whether each image layer is trusted based on the indexed metadata and a plurality of integrity rules, wherein determining whether each image layer is trusted further comprises:
　　determining whether the image layer is composed from a trusted image, and
　　determining whether the image layer meets the plurality of integrity rules when the image layer is above a known trusted image layer of the plurality of image layers; and
　　pulling each image layer that is not determined as trusted.

9. A system for maintaining image integrity in a containerized environment, the containerized environment including a software container having at least one image layer, the system comprising:
　a processing circuitry; and
　a memory, the memory containing instructions that, when executed by the processing circuitry, configure the system to:
　index metadata of the software container, wherein the indexed metadata includes a unique signature of each image layer, wherein the signature of each image layer is based on contents of the image layer and of each previous image layer of tho a plurality of image layers;
　determine whether each image layer is trusted based on the indexed metadata and a plurality of integrity rules, wherein the system is further configured to:
　　determine whether the image layer is composed from a trusted image, and
　　determine whether the image layer meets the plurality of integrity rules when the image layer is above a known trusted image layer of the plurality of image layers; and
　　pull each image layer that is not determined as trusted.

10. The system of claim 9, wherein the system is further configured to:
　determine whether the image layer is composed from an image that was pushed by at least one trusted user.

11. The system of claim 9, wherein the system is further configured to:
　determine whether the image layer contains at least one potentially vulnerable software package.

12. The system of claim 11, wherein a software package is potentially vulnerable when at least one of: the software package includes at least one known vulnerability, the software package includes a custom script, and the software package is not up-to-date.

13. The system of claim 9, wherein the system is further configured to:
　determine whether the image layer overrides at least one file path.

14. The system of claim 9, wherein determining whether the image layer is composed from a trusted image is based on the indexed metadata and a machine learning model trained to detect trusted images using a training set including historical indexed metadata of a plurality of historical image layers.

15. The system of claim 14, wherein the training set metadata includes at least one of: contents of each historical image layer, name of each historical image layer, repository from which an image of each historical image layer was pulled, a set of repositories from which an image of each historical image layer was pulled, geographic location of a source of an image of each historical image layer, and an entity that pulled an image of each historical image layer.

* * * * *